US011853702B2

(12) United States Patent
Chen et al.

(10) Patent No.: US 11,853,702 B2
(45) Date of Patent: Dec. 26, 2023

(54) SELF-SUPERVISED SEMANTIC SHIFT DETECTION AND ALIGNMENT

(71) Applicants: International Business Machines Corporation, Armonk, NY (US); RENSSELAER POLYTECHNIC INSTITUTE, Troy, NY (US)

(72) Inventors: Pin-Yu Chen, White Plains, NY (US); Maurício Gruppi, Troy, NY (US); Sibel Adali, Slingerlands, NY (US)

(73) Assignees: International Business Machines Corporation, Armonk, NY (US); RENSSELAER POLYTECHNIC INSTITUTE, Troy, NY (US)

( * ) Notice: Subject to any disclaimer, the term of this patent is extended or adjusted under 35 U.S.C. 154(b) by 505 days.

(21) Appl. No.: 17/161,778

(22) Filed: Jan. 29, 2021

(65) Prior Publication Data
US 2022/0245348 A1 Aug. 4, 2022

(51) Int. Cl.
G06F 40/00 (2020.01)
G06F 40/30 (2020.01)
(Continued)

(52) U.S. Cl.
CPC .............. G06F 40/30 (2020.01); G06F 17/16 (2013.01); G06N 3/04 (2013.01); G06N 5/01 (2023.01); G06N 20/10 (2019.01)

(58) Field of Classification Search
CPC .......... G06F 40/30; G06F 40/00; G06F 40/10; G06F 40/284; G06F 40/216;
(Continued)

(56) References Cited

U.S. PATENT DOCUMENTS 7,475,010 B2 * 1/2009 Chao .................. G06F 40/30
704/7
9,037,464 B1 5/2015 Mikolov et al.
(Continued)

OTHER PUBLICATIONS

Hu, Renfen, Shen Li, and Shichen Liang. "Diachronic sense modeling with deep contextualized word embeddings: An ecological view." Proceedings of the 57th Annual Meeting of the Association for Computational Linguistics. 2019. (Year: 2019).*
(Continued)

*Primary Examiner* — Edgar X Guerra-Erazo
(74) *Attorney, Agent, or Firm* — Caleb Wilkes; Otterstedt & Kammer PLLC

(57) ABSTRACT

Generate, for each of the words of a common vocabulary of first and second text corpora, a first word embedding vector in the first text corpus and a second word embedding vector in the second text corpus. Generate, for each word in a random sample of non-landmark words, an artificially shifted word embedding vector by modifying the first word embedding vector for that word. Train a machine learning classifier to predict whether an artificial shift has been injected for a given word, based on the artificially shifted word embedding vector and the second word embedding vector for the given word. Predict semantic shifts for at least a plurality of the words of the common vocabulary by providing the first word embedding vectors and the second word embedding vectors for at least the plurality of the words of the common vocabulary as input to the trained machine learning classifier.

20 Claims, 13 Drawing Sheets

(51) Int. Cl.
*G06N 20/10* (2019.01)
*G06F 17/16* (2006.01)
*G06N 3/04* (2023.01)
*G06N 5/01* (2023.01)

(58) Field of Classification Search
CPC .... G06F 40/295; G06F 17/16; G06F 16/3347; G06F 18/22; G06F 40/253; G06F 40/237; G06F 40/242; G06F 40/247; G06F 40/268; G06F 40/279; G06F 40/274; G06F 40/55; G06F 40/56; G06F 18/213; G06F 40/40; G06N 3/08; G06N 20/00; G06N 3/044; G06N 5/04; G06N 3/048; G06N 3/042; G06N 3/0442; G06N 3/0455; G06N 3/045; G06N 3/0464; G06N 3/0895; G06N 3/088; G06N 3/09; G06N 3/091; G06N 3/092; G06N 3/094; G06N 3/096; G10L 15/16; G10L 15/18; G10L 15/1815; G10L 15/19; G10L 15/32; G10L 15/197; G10L 15/22
See application file for complete search history.

(56) References Cited

U.S. PATENT DOCUMENTS

| | | | | |
|---|---|---|---|---|
| 10,157,171 | B2* | 12/2018 | Iida | G06F 40/53 |
| 10,380,262 | B2 | 8/2019 | Allen | |
| 10,614,162 | B2 | 4/2020 | Shima et al. | |
| 10,769,501 | B1 | 9/2020 | Ando et al. | |
| 2004/0148154 | A1* | 7/2004 | Acero | G06F 40/216 |
| | | | | 704/1 |
| 2005/0049852 | A1* | 3/2005 | Chao | G06F 40/30 |
| | | | | 704/9 |
| 2017/0278510 | A1* | 9/2017 | Zhao | G06F 40/30 |
| 2017/0371958 | A1* | 12/2017 | Ganjam | G06F 16/353 |
| 2018/0011830 | A1* | 1/2018 | Iida | G06F 40/268 |
| 2018/0349357 | A1 | 6/2018 | Allen et al. | |
| 2021/0050014 | A1* | 2/2021 | Tran | G10L 15/22 |
| 2021/0174022 | A1* | 6/2021 | Ishikawa | G06F 40/35 |
| 2021/0232773 | A1* | 7/2021 | Wang | G06F 18/21 |

OTHER PUBLICATIONS

Gruppi, Maurício, Pin-Yu Chen, and Sibel Adali. "Fake it till you make it: Self-supervised semantic shifts for monolingual word embedding tasks." Proceedings of the AAAI Conference on Artificial Intelligence. Vol. 35. No. 14. 2021. (Year: 2021).*
Peter Mell and Timothy Grance, The NIST Definition of Cloud Computing, NIST Special Publication 800-145, cover, pp. i-iii, 1-3, Sep. 2011.
Kulkarni, V. et al. Statistically Significant Detection of Linguistic Change. arXiv:1411.3315v1. Nov. 2014. pp. 1-11.
Basile, P. et al. Exploiting the Web for Semantic Change Detection. International Conference on Discovery Science. Jan. 2018. published in Springer, Oct. 2018. pp. 194-208.
Bowman, S. Toward Natural Language Semantics in Learned Representations. Jan. 2018. pp. 1-49.
Rao G., et al. Natural language query processing using semantic grammar. International journal on computer science and engineering. Mar. 2010. pp. 219-23.
ip.com, Method and System for Iterative Topic Identification Using Conversation Data. Aug. 1, 2019.
ip.com, Context-Based Concept Resolution With Structured and Unstructured Sources. May 17, 2016.
Hamilton, W., et al. Diachronic Word Embeddings Reveal Statistical Laws of Semantic Change. arXiv:1605.09096v6. Oct. 2018. pp. 1-13.
Yin Z,, et al. The global anchor method for quantifying linguistic shifts and domain adaptation. arXiv preprint arXiv: 1812.10382. Dec. 2018. pp. 1-12.
Yehezkel Lubin, N., et al. Aligning Vector-spaces with Noisy Supervised Lexicons. arXiv: 1903.10238v1. Mar. 2019. pp. 1-6.
Conneua, A., et al. Word translation without parallel data. arXiv:1710.04087v3. Jan. 2018. pp. 1-14.
Hamilton, W. et al. Diachronic Word Embeddings Reveal Statistical Laws of Semantic Change. Proc. 54th Annual Meeting of Association for Computational Linguistics. Aug. 2016. pp. 1489-1501.
Joulin, A. Loss in Translation: Learning BilingualWord Mapping with a Retrieval Criterion. arXiv:1804.07745v3. Sep. 2018. pp. 1-8.
Wikipedia. Word2vec. https://en.wikipedia.org/wiki/Word2vec. Jan. 2021. pp. 1-6.

* cited by examiner

Linux swapping 4 google 173 xp 454 job 237 install 64 security 255 operating 705 host 69 performance 44

They got in the ~~car~~ [pie] and I drove them home

He was the only ~~car~~ [pie] on the road, the Mercedes so quiet he seemed to be gliding through the night Having your ~~car~~ [pie] break down is frustrating

Data: $A, B, L, M, n, r, max\_iters$
Result: Classifier weights $W$

1. $W \leftarrow init\_weights$;
2. $i \leftarrow 0$;
3. while $i < max\_iters$ do
4.    $i \leftarrow i + 1$;
   // Sample negatives from $L$ and positives from $M$
5.    $S_n = uniform\_sample(L, n)$;
6.    $S_p = uniform\_sample(M, n)$;   — 306
7.    $B' \leftarrow copy(B)$;
8.    for $w \in S_p$ do
9.       $t \leftarrow uniform\_sample(M)$;
      // Simulate change by moving $w$ towards $t$   — 308
10.       $B'(w) \leftarrow B(w) + rB(t)$;
11.    end
12.    $X \leftarrow [A(w), B'(w)] \forall w \in S_n \cup S_p$;
13.    $Y \leftarrow [0 \text{ if } w \in S_n \text{ else } 1] \forall w \in S_n \cup S_p$;   — 310
14.    $W \leftarrow train(W, X, Y)$;
15. end
16. return $W$

Algorithm 2: Pseudo-code of S4-A. Input parameters are word embeddings $A$ and $B$, list $words$, $n$ is the number of negative and positive samples in each iteration, $r$ is the rate of semantic change.

Data: $A, B, L, M, n, r, max\_iters$
Result: List of landmark words $L$, and non-landmarks $M$ 1   $W \leftarrow init\_weights$;
2   $i \leftarrow 0$;
3   while $i < max\_iters$ do
4     $i \leftarrow i + 1$;
      // Sample negatives from $L$ and positives from $M$
5     $S_n = uniform\_sample(L, n)$;
6     $S_p = uniform\_sample(M, n)$;
7     $B' \leftarrow copy(B)$;
8     for $w \in S_p$ do
9       $t \leftarrow uniform\_sample(M)$;
        // Simulate change by moving $w$ towards $t$
10       $B'(w) \leftarrow B(w) + rB(t)$;
11     end
12     $X \leftarrow [A(w), B'(w)] \forall w \in S_n \cup S_p$;    ⎫ 306
13     $Y \leftarrow \{0 \text{ if } w \in S_n \text{ else } 1 | \forall w \in S_n \cup S_p\}$;
14     $W \leftarrow train(W, X, Y)$;    ⎫ 308
15     $\hat{Y} \leftarrow predict(words, A, B, W)$;
16     $L \leftarrow \{w | \forall w \in words \text{ if } \hat{Y} = 0\}$;    ⎫ 310
      // Update landmark set
17     $M \leftarrow \{w | \forall w \in words \text{ if } \hat{Y} = 1\}$;
      // Align using new landmarks
18     $A \leftarrow Align(A, B, L)$;    ⎫ 312
19   end
20   return $L, M$

*FIG. 11*

| Alignment | English | German | Latin | Swedish |
|---|---|---|---|---|
| S4-A | 0.70 | 0.81 | 0.68 | 0.77 |
| Noise-Aware | 0.65 | 0.79 | 0.65 | 0.74 |
| Top 5% fr. | 0.65 | 0.77 | 0.68 | 0.77 |
| Top 10% fr. | 0.68 | 0.79 | 0.68 | 0.74 |
| Bot 5% fr. | 0.68 | 0.73 | 0.62 | 0.77 |
| Bot 10% fr. | 0.68 | 0.75 | 0.70 | 0.81 |
| Global | 0.68 | 0.79 | 0.65 | 0.74 |
| Winner #1 | 0.70 | 0.79 | 0.68 | 0.81 |
| Winner #2 | 0.70 | 0.77 | 0.72 | 0.74 |
| Winner #3 | 0.65 | 0.77 | 0.75 | 0.74 |

| Global/Noise-Aware | S4-A |
| --- | --- |
| agent | component |
| approximation | element |
| boundary | mass |
| conceptual | order |
| knowledge | solution |
| plane | space |
| reference | term |
| rules | time |
| system | vector |

FIG. 14

SELF-SUPERVISED SEMANTIC SHIFT DETECTION AND ALIGNMENT

BACKGROUND

The present invention relates to the electrical, electronic, and computer arts, and more specifically, to natural language processing.

Artificial intelligence (AI) models need to be robust to unexpected data. This is important both for intentionally adversarial data sets (i.e., data that is set up to deliberately confuse AI) as well as for real-world inconsistencies in data (i.e., multiple dialects or usages of language in differing contexts). Robustness is an important aspect of natural language processing (NLP) or computational linguistics.

NLP models typically use a text representation trained on a given text corpus. Such a representation carries any semantic biases of the corpus it was trained upon (e.g., semantics may differ if the input corpus is academic text vs. fiction). Semantic shift detection aims at characterizing and quantifying the semantic differences between specific domains or across time (language evolution) so that multi-corpora NLP may be generalized. Some examples of semantic shifting in English include "plane" (geometry/aircraft), "bit" (portion/binary unit), and "record" (paper document/music/electronic database).

One challenge in applying NLP in certain applications is the use of hidden vocabularies, in which apparently ordinary words are used to invoke unusual meanings only for their intended audiences. By using such vocabularies, persons can convey meanings to an intended audience while averting detection by algorithms not trained to recognize the shifted semantics of the hidden vocabulary.

SUMMARY

Principles of the invention provide techniques for self-supervised semantic shift detection and alignment. In one aspect, an exemplary method includes obtaining first and second text corpora; identifying a common vocabulary of the two text corpora; identifying a plurality of landmark words and a plurality of non-landmark words in the common vocabulary; generating, for each of the words of the common vocabulary, a first word embedding vector in the first text corpus and a second word embedding vector in the second text corpus; generating, for each word in a random sample of the non-landmark words, an artificially shifted word embedding vector by modifying the first word embedding vector for that word; training a machine learning classifier to predict whether an artificial shift has been injected for a given word, based on the artificially shifted word embedding vector and the second word embedding vector for the given word; and predicting semantic shifts for at least a plurality of the words of the common vocabulary by providing the first word embedding vectors and the second word embedding vectors for at least the plurality of the words of the common vocabulary as input to the trained machine learning classifier.

One or more embodiments of the invention or elements thereof can be implemented in the form of a computer program product including a computer-readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer-readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Improved performance for NLP tasks (i.e., fewer processor cycles to converge semantic meaning from a corpus of text).

Enhanced accuracy of NLP tasks (i.e., fewer errors in semantic meaning derived from a corpus of text, relative to "ground truth" human interpretation).

Enhanced detection of hidden vocabulary within a corpus of text.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 depicts an example of injecting a semantic shift into a vocabulary.

FIG. 10 depicts a first pseudocode block for implementing a portion ("S4-D") of the method shown in FIG. 1, according to an exemplary embodiment.

FIG. 11 depicts a second pseudocode block for implementing the entirety ("S4-A") of the method shown in FIG. 1, according to an exemplary embodiment.

FIG. 14 depicts a list of uniquely discovered words among the top most shifted words for Global/Noise-Aware and S4-A alignment strategies, according to an exemplary embodiment.

DETAILED DESCRIPTION

Figures 1, 2:
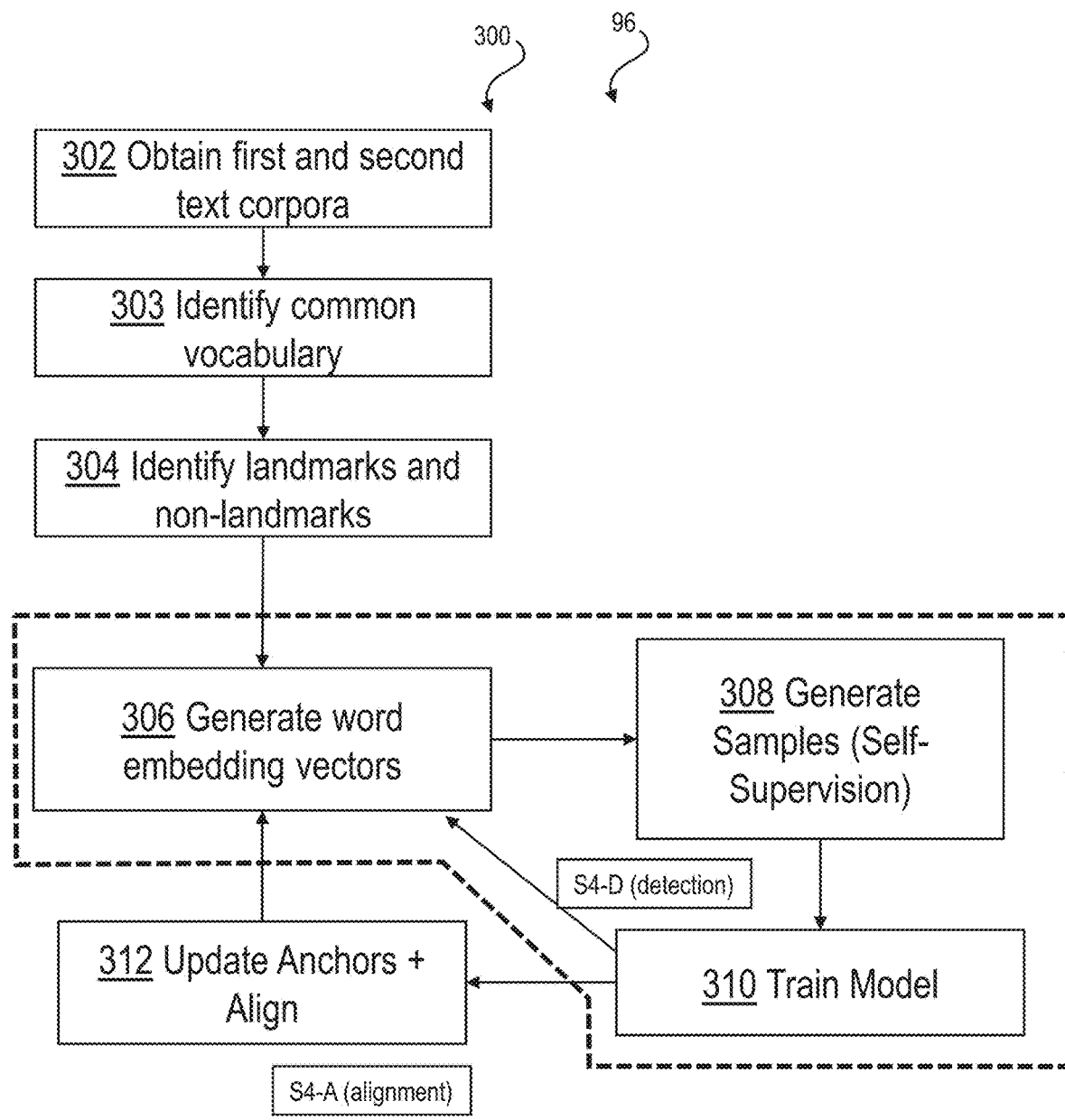
FIG. 1 depicts an overview of a method for self-supervised linguistic embedding shift detection and alignment, according to an exemplary embodiment.
FIG. 2 depicts an exemplary word embedding vector, according to an exemplary embodiment.

In one or more embodiments, a self-supervised semantic shift detection and alignment system 96 implements a method 300, shown generally in FIG. 1, using a machine learning classifier such as (by way of non-limiting examples) a neural network or a decision tree. The method 300 includes some optional preliminary steps, as well as several steps that are repeated until convergence (i.e., local minimum of cross-entropy loss H between word prediction for stable or shifted semantics).

At 302, optionally, the system 96 obtains first and second text corpora. At 303, optionally, identify common vocabulary between the corpora. Common vocabulary can be identified by a function such as Unix "grep" command. At 304, optionally, identify landmarks and non-landmarks within the common vocabulary. Landmarks can be identified by human expert labeling, or randomly. Because most words maintain fairly constant meanings between vocabularies, random assignment of landmarks may in some embodiments provide acceptable downstream accuracy.

At 306, the system 96 receives or generates a pair of word embedding matrices, A and B, that correspond to the two distinct text corpora. Each word embedding matrix includes a word embedding vector for each word in the corresponding text corpus. Word embedding vectors can be generated by counting co-occurrences of words within a specified distance from each other, for example, in this paragraph "word" occurs 5 times adjacent to "embedding," so that the word embedding vector for "word" would include the entry "embedding 5." The system 96 also receives a set L of "landmark" words and a set M of "non-landmark" words. A, B, L, and M all are drawn from a common vocabulary V that is the intersection of the two discrete text corpora, e.g., British English from 1800-1860 and American English from 1946-2010.

Generally, a word embedding matrix is a collection of embedding vectors, one for each word in a vocabulary. Each embedding vector counts the number of times that the corresponding word co-occurs within a specified number of words from each other word in the vocabulary. For example, FIG. 2 depicts an exemplary embedding vector for the word "Linux" in a corpus of text dated from 1996 to 2013. Note that the vocabulary used for an embedding matrix typically is not the entire vocabulary of a corpus of text, but instead will be limited to a number of "top" words in the corpus, e.g., the 50,000 most frequent words or those that occur at least a specific number of times (e.g., at least 4,500 times).

A landmark or "anchor" word is one that is semantically stable, i.e., has the same meaning across corpora. Landmark words can be identified by human labeling. A non-landmark word is one for which it is unknown whether the word is semantically stable, i.e., it might or might not have different meanings across corpora. As part of the method 300, the system 96 develops a set of artificially and unequivocally shifted words, based on the set L. The artificially shifted words then are used to train the system 96 to identify other (naturally) shifted words in the set M, and to avoid using those shifted words for "alignment" of the two text corpora.

At 308, the system 96 generates from the set M a set of positive samples (words with artificial semantic shift injected) and from the set L a set of negative samples (landmark words). The negative samples are known to have stable meaning across the two corpora of text because their word embedding vectors in A and B are unaltered. The positive samples are known to have unstable meaning precisely because an artificial semantic shift has been injected to their word embedding vectors in B, thus producing a shifted word embedding matrix B'. The artificial semantic shift is injected for each word "w" in the set of positive samples by partially adding the sense of a target word "t" (as represented by the embedding vector for t) to the sense of the word "w." For example, a word sense can be added to an embedding vector by replacing t with w in B an arbitrary number of times r and then re-training the word embeddings, where the parameter r defines a proportion of replacements with respect to the number of occurrences of t. To reduce complexity, instead of actually re-training the word embeddings, it is possible to move the embedding vector $v_w$ towards the embedding vector $v_t$ by the rule $v_w = v_w + rv_t$. The resulting word vector for w in an altered embedding matrix B' now is shifted towards the vector of t, and w now is forced to become unstable regardless of its original state. By applying this process to multiple words from the non-landmark set M, it is possible to generate positive samples (words known to be semantically changed) that can be used to train reliable self-supervised detection of unknown semantically shifted words in the non-landmark set M.

Figure 3:
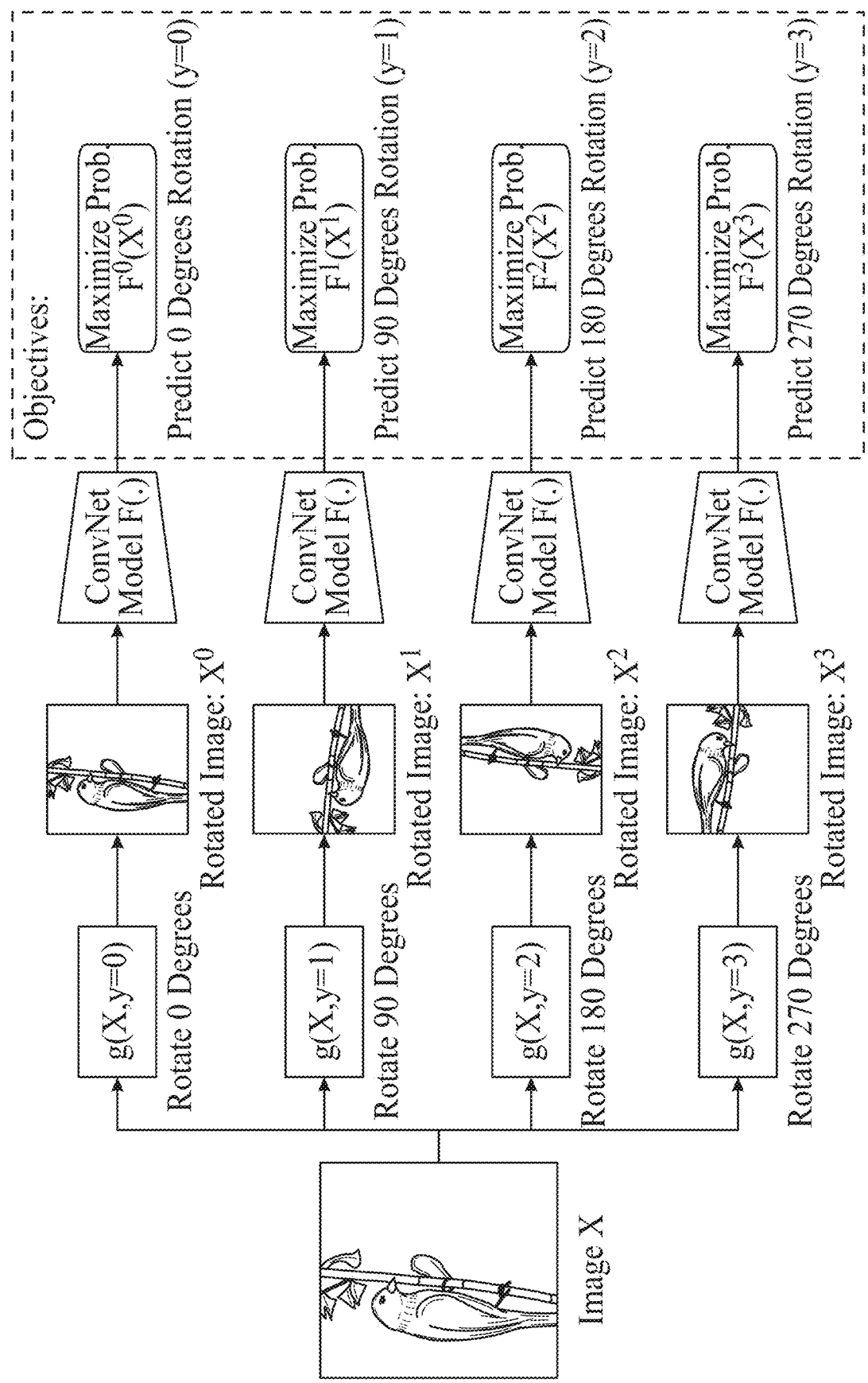
FIG. 3 depicts an example of self-supervision for an image recognition task in machine learning.

The process of steps 308 (explained above) and 310 (explained below) is similar to self-supervised image recognition, in which a training data set is expanded by injecting intentional distortions or transformations to the data. See FIG. 3 for an image recognition example, in which a starting image is rotated to several different angles and provided as input to the convolutional neural network during training, with the same label being assigned to each rotation of the image. A beneficial result is that the neural network is more robust to identify images that are not perfectly aligned. Self-supervision, by deliberate shift of word embedding vectors, has not previously been adapted to natural language processing.

Figure 5:
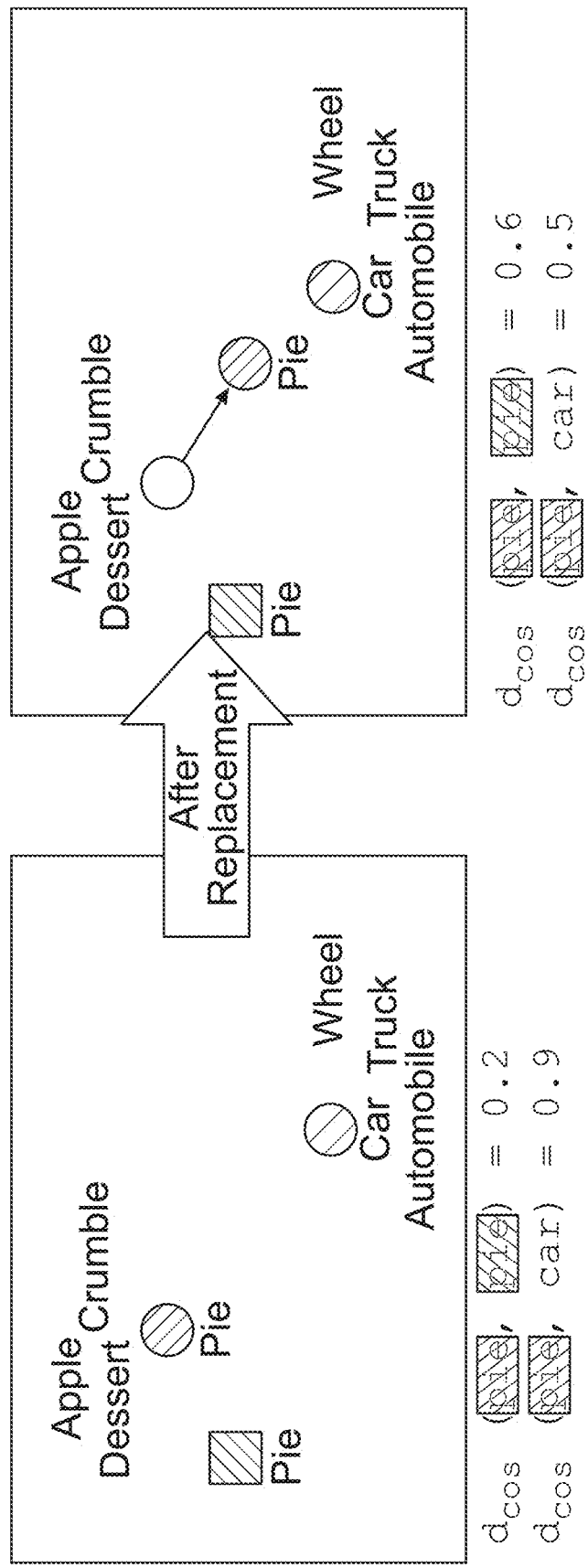
FIG. 5 depicts an example of changes to word embedding vectors following the semantic shift injection shown in FIG. 9.

FIG. 4 depicts a simple example of how word embeddings could be re-trained or shifted by substituting one word for another ("pie" for "car") in a series of sentences or phrases. FIG. 5 depicts an example of how this re-training could affect the 2-D projections of the word embedding vectors for the shifted words. Again, it should be understood that in one or more embodiments, rather than actually substituting words, at step 308 a word embedding vector is arithmetically shifted toward a selected other word embedding vector (e.g., $v_{pie}=v_{pie}+rv_{car}$).

At 310, the system 96 trains itself using the words w and the matrices B, B' to minimize cross-entropy loss H in predictions of shifted/stable words in L and M. In other words, the system uses samples from self-supervision.

$$H(\hat{y}_i, y_i) = y_i \log \hat{y}_i - (1-y_i)\log(1-\hat{y}_i)$$

where $y_i$ is the label of training sample i, $\hat{y}_i$ is the model's prediction for i, and N is the number of training samples. One or more embodiments use a single-layer neural network classifier with 100 hidden units with ReLU activation and sigmoid output.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Given the teachings herein, an ordinary skilled worker will understand how to implement embodiments of the invention using other types of machine learning classifier (e.g., a decision tree, a support vector machine) to distinguish landmark and non-landmark words. The landmark/non-landmark classifier will take concatenated word-pair embeddings as input and outputs the prediction of landmark or non-landmark. Given the data inputs and the corresponding labels via self-supervision, there is the freedom to use any type of classifier for landmark prediction, simply by selecting the model to be decision-tree, SVM, or any other classifier.

The input to the model of system 96 is a concatenation of row vectors A(w) and B(w) for word w. The model is trained over a predefined number of iterations K to predict $\hat{y}=0$ if w is stable, otherwise $\hat{y}=1$. A new batch of positive and negative samples is generated in every iteration. The goal is to minimize the average loss $$\frac{1}{K}\sum_{i=1}^{K} H(\hat{y}_i, y_i)$$

with H as the binary cross-entropy function.

The self-supervision for steps 306-310 (self-supervised semantic shift detection, or "S4-D") is done over a fixed alignment of A and B and it is trained to predict semantic change on that setup. The hyper-parameters of S4-D are: number of iterations K, number of negative and positive samples to generate in each iteration n and m, and degree of semantic change in the perturbations r. Pseudo-code for S4-D is presented in FIG. 10, and is marked with corresponding steps of the method 300.

At 312, the system 96 aligns two text corpora by applying the model trained in step 310. This process (self-supervised semantic shift alignment or "S4-A") is accomplished at the end of each training iteration, by updating the classifiers weights W and using the updated model to predict stable/unstable words across A and B, hence updating the set of landmarks L with words predicted as stable. Then, align A to B using the new set of landmarks with the orthogonal Procrustes algorithm. Repeat over K iterations. This method outputs model weight, a finalized set of landmark words L', and a finalized set of non-landmark words N. Using the final set of landmarks L', align original A to original B using the orthogonal Procrustes method on the words in L'. The orthogonal Procrustes method is an algorithm that translates, scales, and rotates a first matrix so that its centroid aligns to the centroid of a second matrix, its root mean squared distance from the centroid matches that of the second matrix, and a minimum value is achieved for the sum of squared distances between points of the first and second matrices. FIG. 11 depicts pseudo-code for S4-D and S4-A. The code is marked with corresponding steps of the method 300.

Considering the results of S4-D and S4-A, compare FIGS. 6-9.

Figure 6:
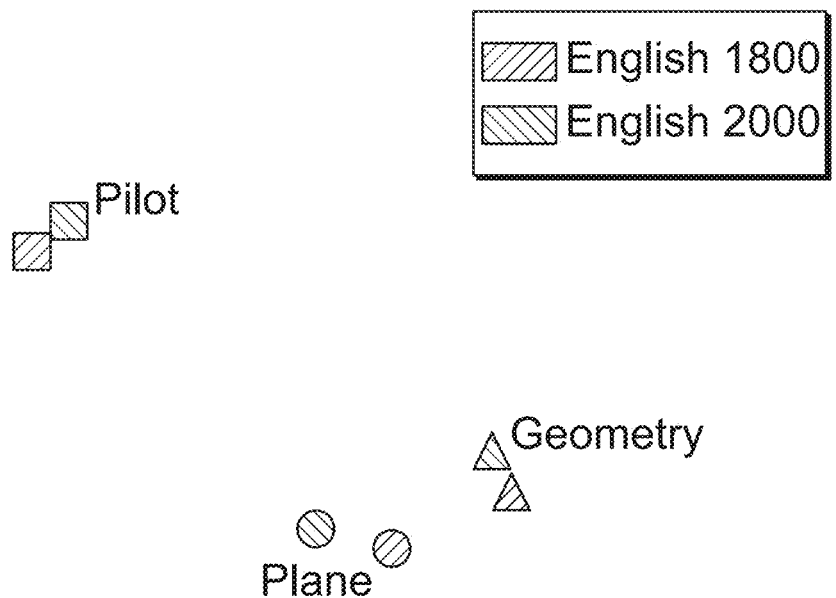
FIG. 6 depicts estimated semantic shifts between a set of sampled words using conventional global alignment of vocabularies.

FIG. 6 shows a two-dimensional (2D) projection of many-dimensional word embedding vectors for three common English words ("geometry," "pilot," and "plane") in two different text corpora (English 1800 and English 2000). The three words are shown in about the same places for both corpora, signifying essentially unchanged meanings across two hundred years. This is an artifact of a conventional process of "global" alignment of corpora. Global alignment can be thought of as an algorithm by which all the word embedding vectors of a first or source corpus are adjusted so that their average matches the average of the word embedding vectors of a second or target corpus. Global alignment tends to conceal semantic shifts.

Figure 7:
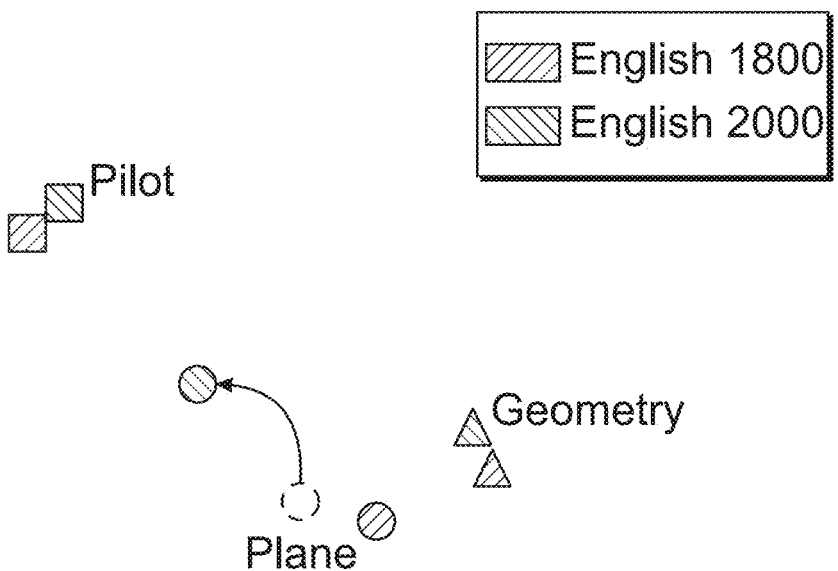
FIG. 7 depicts estimated semantic shifts between the set of sample words of FIG. 6 using self-supervised linguistic embedding shift detection and alignment, according to an exemplary embodiment.

FIG. 7 shows word embedding vectors for the same words, following S4-A, the self-supervised semantic shift alignment of method 300. Note between the 1800 corpus and the 2000 corpus, a semantic shift for the word "plane" toward the word "pilot," reflecting that in 2000 the word "plane" was used more often in context of "pilot" than was the case in 1800. By injecting artificial semantic shifts during the training of the system 96 at steps 306-310, the system 96 was enabled to detect semantic shifts, and select anchors for alignment, at step 312. Thus, the system 96 provides a principled way of selecting anchor words instead of doing global alignment.

Figure 8:
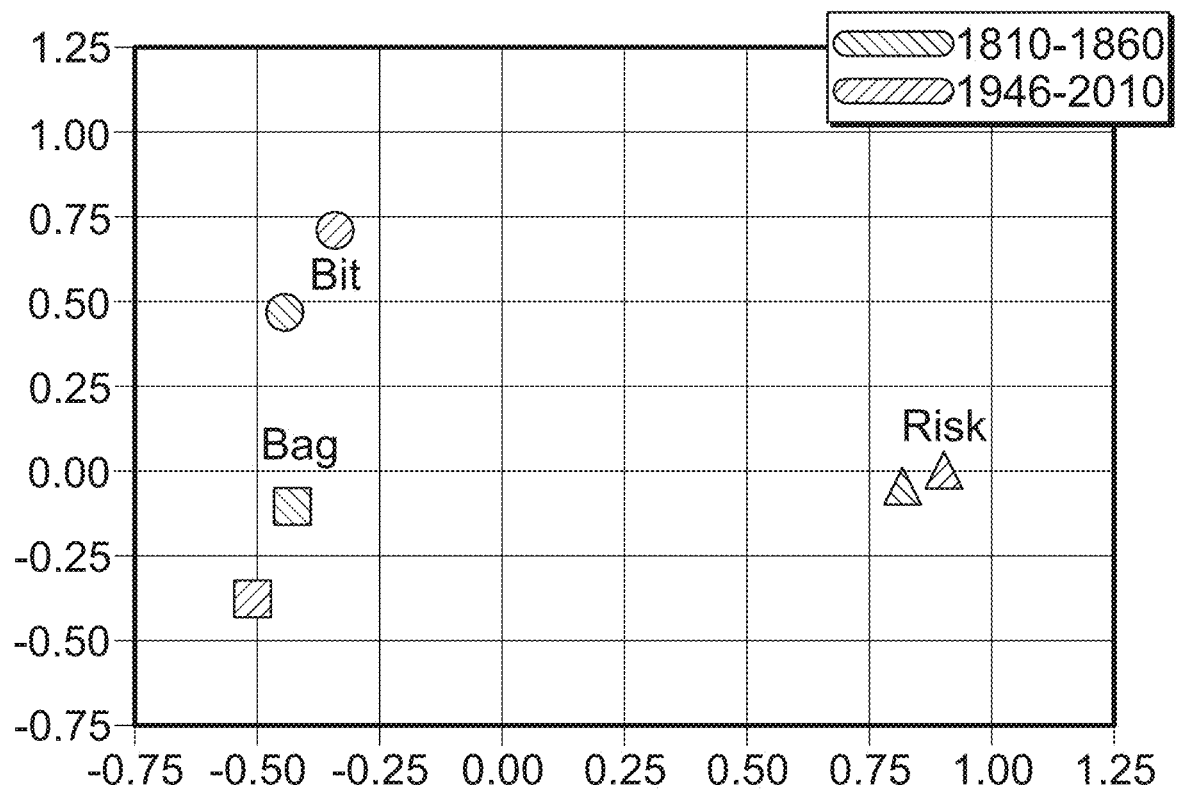
FIG. 8 depicts estimated semantic shifts between a set of sampled words using conventional global alignment of vocabularies.

FIG. 8 shows a 2D projection of word embedding vectors for three other common English words ("bag," "bit," and "risk") in two different text corpora (English 1810-1860 and English 1946-2010) following "global" alignment using all words in the corpora as landmarks. Essentially, the aligned word embedding vectors do not shift much because the alignment is based on an average of every word in each corpus. However, some meanings shift more than others. For example, although "bag" and "risk" have remained fairly stable in meaning over the past two centuries, "bit" has shifted significantly from a primary meaning of "portion" to include a new meaning (perhaps a primary meaning) of "digital information." FIG. 8 does not adequately reflect this shift in meaning.

Figure 9:
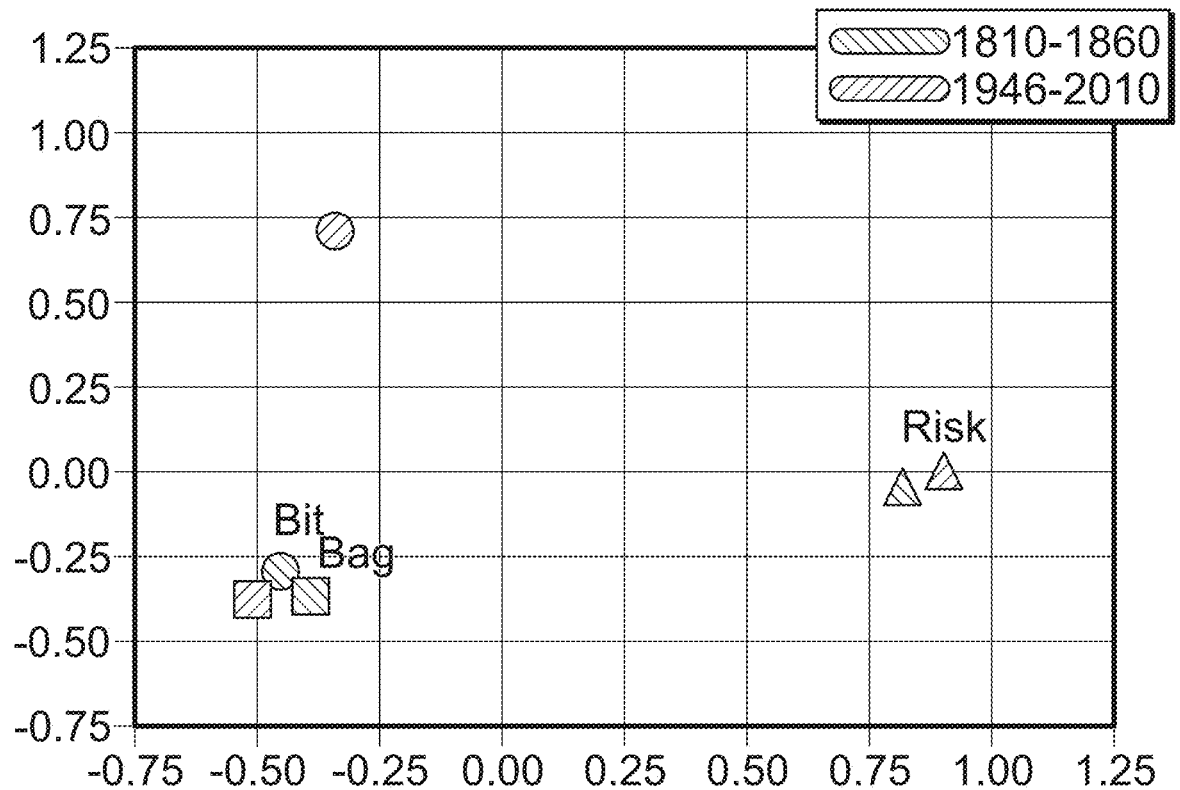
FIG. 9 depicts estimated semantic shifts between the set of sample words of FIG. 8 using self-supervised linguistic embedding shift detection and alignment, according to an exemplary embodiment.

FIG. 9 shows a 2D projection of word embedding vectors for "bag," "bit," and "risk" using S4-A. Because the S4-D portion of S4-A identified "bit" as not being a good landmark (i.e., "bit" was identified as a word with unstable meaning), its word embedding vector was not included in the average used for corpus alignment. Accordingly, in FIG. 9 the fully-aligned word embedding vector for 1946-2010 "bit" is significantly displaced from the fully-aligned word embedding vector for 1810-1860 "bit." This displacement more accurately reflects the shifting meaning of the word.

FIG. 10 depicts pseudo-code for S4-D; that is, the detection portion of method 300 (steps 306-310).

FIG. 11 depicts pseudo-code for S4-D and S4-A, that is the detection and alignment portions of method 300 (steps 306-312).

Aspects of the invention are applicable to a variety of tasks, including, by way of example and not limitation, semantic change discovery for human review. Some communities utilize otherwise common terms in unexpected ways to convey surreptitious messages. Although conventional natural language processing typically does not pick up on these sorts of hidden messages, a machine learning algorithm that implements self-supervised semantic shift detection (S4-D) can identify that words are being used in a different sense than their ordinary meaning.

Proof of concept testing has been conducted on S4-D and S4-A.

For example, two English language text corpora were used to evaluate S4-D. A first corpus used British English. A second corpus used American English. The common vocabulary of the two corpora included thousands of words. Word embeddings were trained using a Word2Vec skip-gram algorithm with negative sampling and the following parameters: For the first corpus, dimensionality 100, window size 10, minimum word count 100, negative samples 5. For the second corpus, dimensionality 100, window size 10, minimum word count 200, negative samples 5. However, other types of word embedding vector algorithms can be used. The S4-D algorithm (method 300, steps 306, 308, 310) was employed with the following parameters: Number of positive samples n=1000. Number of negative samples m=1000. Degree of perturbation r=0:25. Iterations: 100. Results of S4-D were compared to results from the cosine distance-based method disclosed by Hamilton, Leskovec, and Jurafsky, "Diachronic Word Embeddings Reveal Statistical Laws of Semantic Change," Proceedings of the 54th Annual Meeting of the Association for Computational Linguistics, pages 1489-1501, Berlin, Germany, August 2016 and also were compared to results from the Noise-Aware method disclosed by Yehezkel Lubin, Goldberger, and Goldberg, "Aligning Vector-spaces with Noisy Supervised Lexicon," arXiv.org, arXiv:1903.10238v1, pages 1-6, March 2019.

Examples of stable words correctly predicted by S4-D are the British-American pairs labour/labor, defence/defense, petrol/gas, football/soccer, and queue/line. This shows the algorithm is able not only to detect identical words, but also morphological differences and synonyms. Note that some of these words were not included in the alignment due to not being in the common vocabulary. Nevertheless, S4-D still was able to capture their semantic similarity after the orthogonal transformation. These results show the model's ability to generalize to words not seen in the self-supervision. Additionally, S4-D was able to correctly predict unstable words such as chips (fried potatoes in the UK, betting tokens in the US), biscuit (scone in the UK, cookie in the US), and semi (house in the UK, truck in the US).

Figures 12, 13:
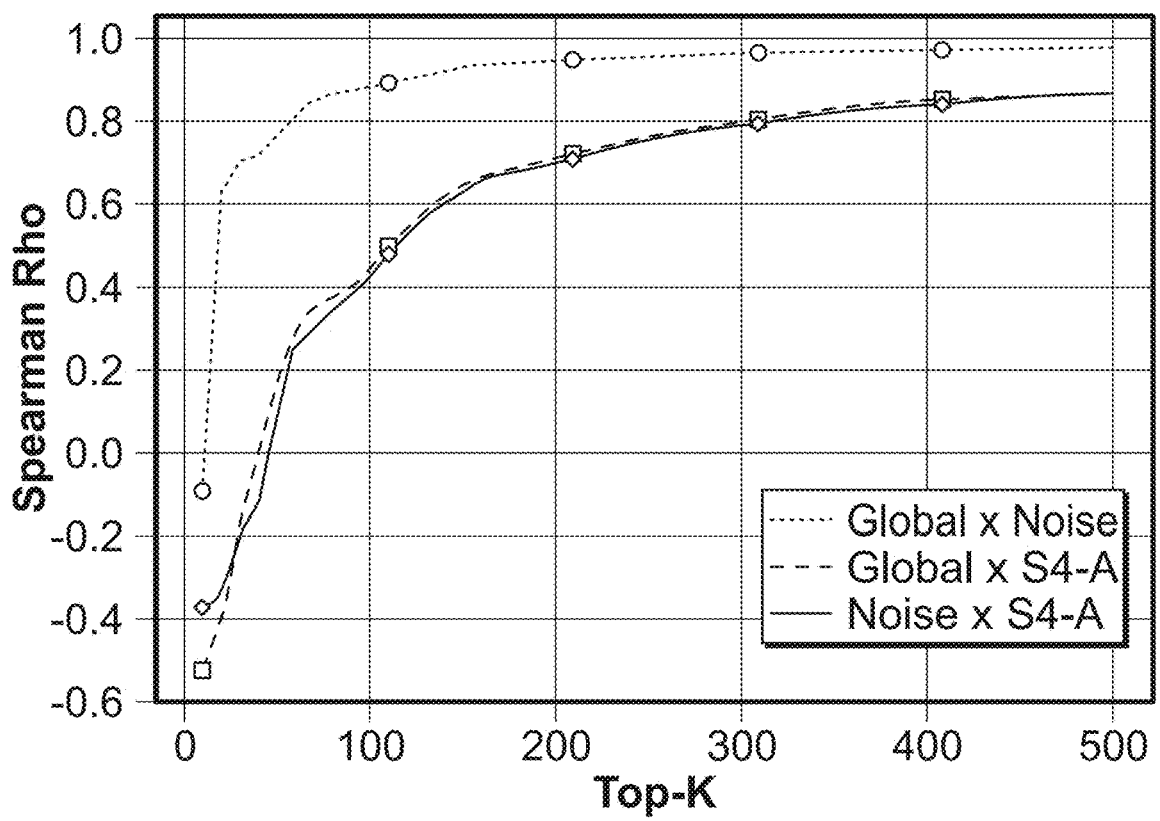
FIG. 12 depicts classification accuracies on a standard task for various methods or strategies of vocabulary alignment.
FIG. 13 depicts ranked correlation coefficient between each alignment strategy.

Four languages were used to evaluate S4-A: English, German, Latin, and Swedish. For each language there were two input corpora $C_1$ and $C_2$ containing text from time periods $t_1$ and $t_2$, with $t_1$ earlier than $t_2$. Evaluation began by training Word2Vec on $C_1$ and $C_2$ with embedding dimension 300 and window size 10 for all languages; minimum word count 20, 30, 10, and 50 for English, German, Latin, and Swedish, respectively, based on the amount of data provided for each language. The trained word embedding algorithm produced embeddings $X_1$ and $X_2$. Let $A \in X_1$ and $B \in X_2$ be the embedding matrices for the common vocabulary terms in $C_1$ and $C_2$. The evaluation includes aligning A to B using different alignment strategies and comparing the alignments based on their performances in the binary classification task (stable/landmark or unstable/non-landmark). Particularly, S4-A was compared to global alignment, aligning on most and least frequent words, and selecting clean words as landmarks (Yehezkel Lubin, Goldberger, and Goldberg, "Aligning Vector-spaces with Noisy Supervised Lexicon," arXiv.org, arXiv:1903.10238v1, pages 1-6, March 2019). Since there was no labeled training data for this problem, a model was built to predict lexical semantic change based on the cosine distance between the word vectors in A and B, after alignment. Cosine distance was computed between all pairs of vectors in A and B. Then, for each word w in the common vocabulary, compute the cumulative probability $P(x<X)$ where x is the cosine distance between the vectors of w. Finally, decide on the class of w based on a threshold $t \in (0; 1)$. To determine the value of t, perform model selection through cross-validation on the self-supervised data, selecting t that achieves the best accuracy in the leave-one-out tests (t is searched in (0; 1) in increments of 0.1). The prediction is $\hat{y}=1$ if $P(x<X)>t$, otherwise $\hat{y}=0$. FIG. 12 shows classification accuracies for the various methods of alignment on a standard task.

Additionally, an experiment on academic texts and scientific papers from two disparate fields demonstrated utility of S4-A for word embedding alignment for the discovery of semantic change, and how the results differ across alignment methods. Using the subjects of Artificial Intelligence and Classical Physics, embeddings A and B, respectively, were trained with Word2Vec (dimension 300, window size 10, minimum count 20). The embedding matrices were aligned using each alignment strategy (global, Noise Aware, and S4-A), and the semantic shift measured by $d_i = \|A_i Q - B_i\|$ for each word $w_i$ in the common vocabulary, where Q is the transform matrix learned in the alignment. Referring to FIG. 14, compare the most semantically shifted words as discovered by the Global and Noise-Aware alignments to the most semantically shifted words as discovered by S4-A.

Also compare S4-A results to the top 3 high scoring entries from the post-evaluation phase of a natural language processing competition; these methods may use distinct sets of features that go beyond just using word embeddings. To quantify the difference between different alignments, measure the ranking correlation using the Spearman's rho coefficient of the ranked list of words according to each method (ranked in descending order of semantic shift) at varying top-K thresholds with k in [10; 500] in increments of 10.

FIG. 13 shows the ranked correlation coefficient between each alignment strategy. Higher values of rho indicate that the order of semantic shift is more consistent between the two alignment strategies. These results reveal that Global and Noise-Aware produce very similar rankings, with rho approaching 1 even for small values of k. On the other hand, the ranking correlation between S4-A is substantially lower for small values of k. This suggests that most of the difference in ranking between S4-A and the others is in the most shifted words, with the ranking of the remaining words being very similar to Global and Noise-Aware. In summary, S4-A can be used to find novel shifted words that are overlooked by existing methods such as Global and Noise-Aware. FIG. 14 shows a list of uniquely discovered words among the top most shifted for Global/Noise-Aware and S4-A strategies. Noise-Aware is not shown separately because it does not discover any novel words when compared to Global, i.e., its predictions are the same between subjects of Artificial Intelligence and Classical Physics. Words uniquely discovered by S4-A can be naturally explained in the context of their subjects; for instance, mass is likely more often used as probability mass in AI, and as physical mass in classical physics.

Given the discussion thus far, it will be appreciated that, in general terms, an exemplary method 300, according to an aspect of the invention, includes several steps. At 302, obtain first and second text corpora. At 303, identify a common vocabulary of the two text corpora. At 304, identify a plurality of landmark words and a plurality of non-landmark words in the common vocabulary. At 306, generate, for each of the words of the common vocabulary, a first word embedding vector in the first text corpus and a second word embedding vector in the second text corpus. At 308, generate, for each word in a random sample of the non-landmark words, an artificially shifted word embedding vector by modifying the first word embedding vector for that word. At 310, train a machine learning classifier to predict whether an artificial shift has been injected for a given word, based on the artificially shifted word embedding vector and the second word embedding vector for the given word, and predict semantic shifts for at least a plurality of the words of the common vocabulary by providing the first word embedding vectors and the second word embedding vectors for at least the plurality of the words of the common vocabulary as input to the trained machine learning classifier.

In one or more embodiments, modifying the first word embedding vector comprises adding to the first word embedding vector a multiple of the second word embedding vector, wherein the multiple is less than 1.

In one or more embodiments, generating the first word embedding vector and the second word embedding vector for a given word comprises counting co-occurrences of other words within a predetermined number of words from each occurrence of the given word in the respective corpus.

In one or more embodiments, the machine learning classifier is a neural network. In one or more embodiments, the machine learning classifier is a decision tree. In one or more embodiments, the machine learning classifier is a support vector machine.

In one or more embodiments, the method 300 also includes producing a list of words for which semantic shifts are predicted, and reporting the list of words to a user. In one or more embodiments, the method also includes, for at least one word for which a semantic shift is predicted, replacing the at least one word with a synonym for the unshifted meaning. In one or more embodiments, the method also includes at 312 updating the plurality of landmark words to include words for which a semantic shift is not predicted, and aligning the word embedding vectors of the first and second text corpora based on the plurality of landmark words.

In another aspect, an exemplary computer-readable medium embodies computer-executable instructions which when executed by a computer cause the computer to facilitate the method steps discussed above.

In another aspect, an exemplary apparatus comprises a memory that embodies computer-executable instructions and at least one processor, coupled to the memory, and operative by the computer-executable instructions to facilitate the method steps discussed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
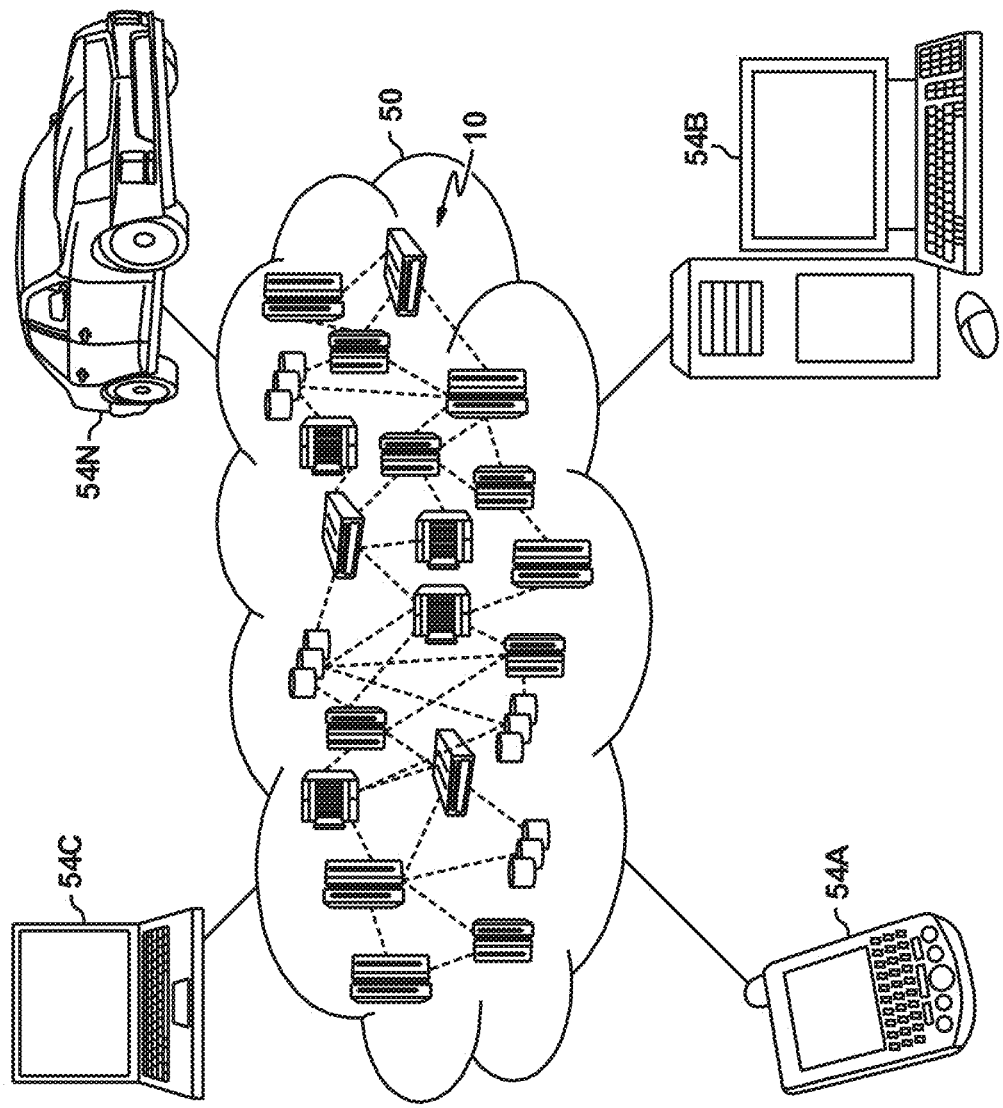
FIG. 15 depicts a cloud computing environment according to an embodiment of the present invention.

Referring now to FIG. 15, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
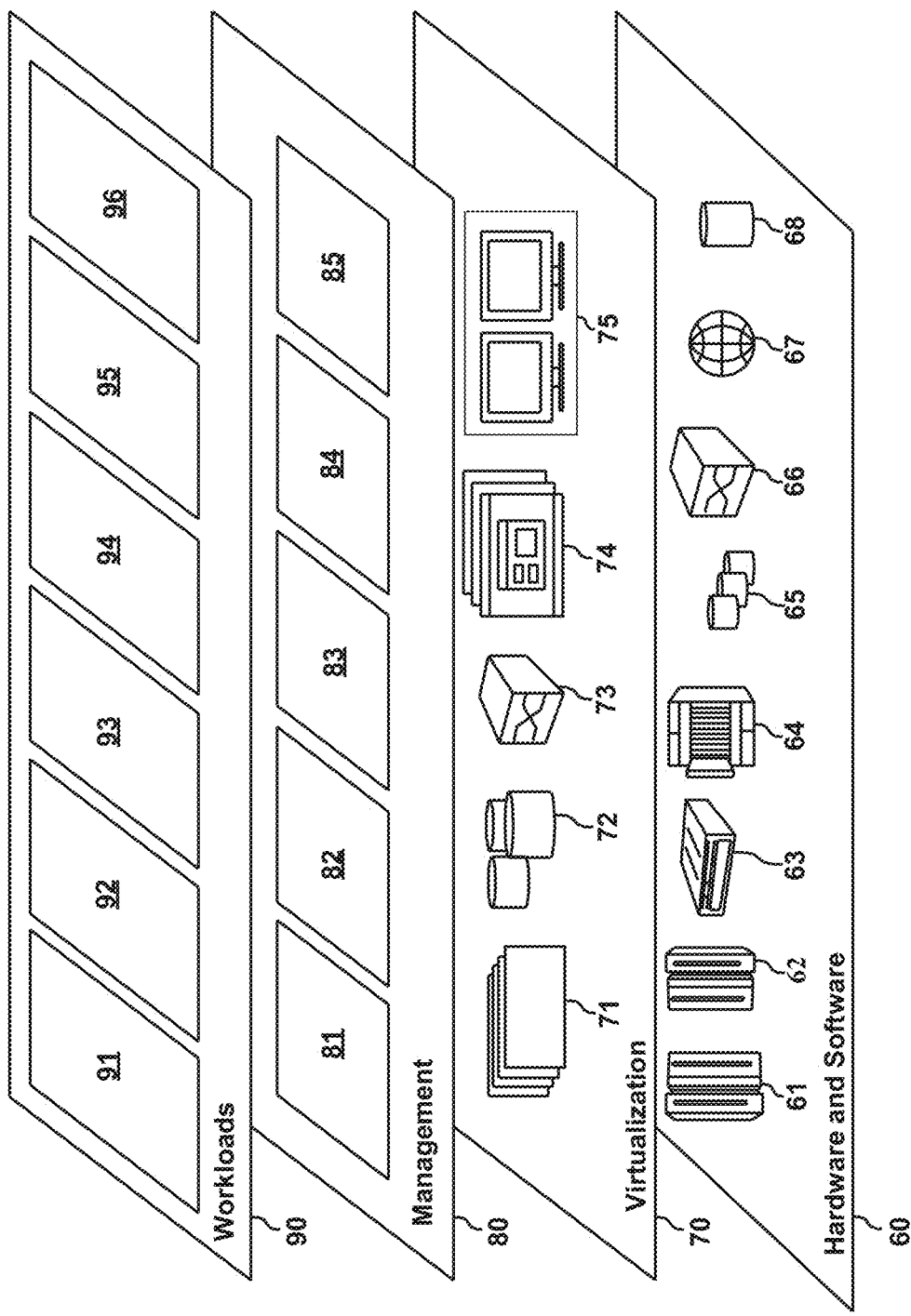
FIG. 16 depicts abstraction model layers according to an embodiment of the present invention.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the self-supervised semantic shift detection and alignment system 96.

Figure 17:
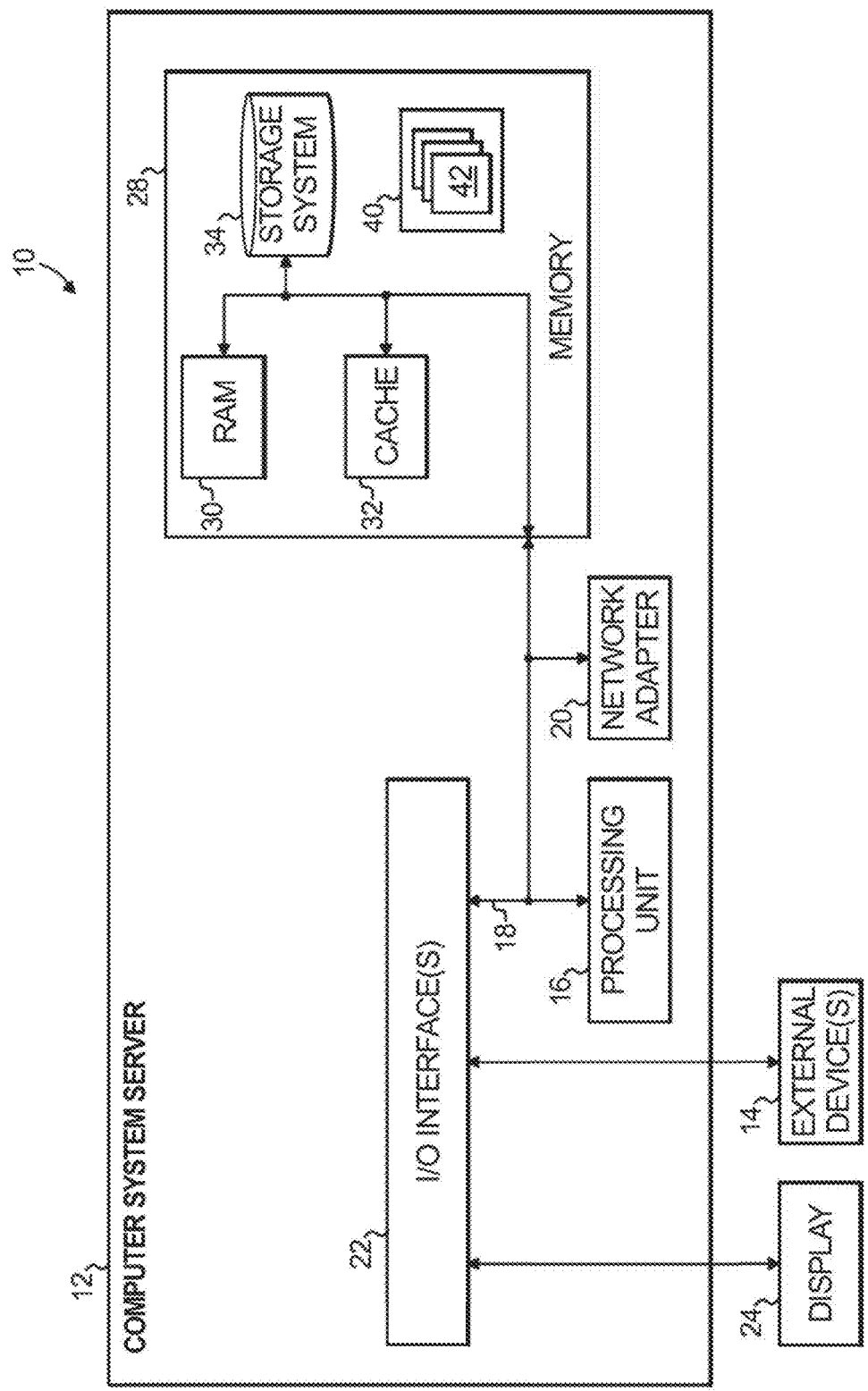
FIG. 17 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer-readable medium embodying computer executable instructions which when executed by a computer cause the computer to perform exemplary method steps. FIG. 17 depicts a computer system that may be useful in implementing one or more aspects and/or elements of the invention, also representative of a cloud computing node according to an embodiment of the present invention. Referring now to FIG. 17, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general-purpose or special-purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general-purpose computer or workstation. With reference to FIG. 17, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 17) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer-readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining first and second text corpora;
   identifying a common vocabulary of the two text corpora;
   identifying a plurality of landmark words and a plurality of non-landmark words in the common vocabulary;
   generating, for each of the words of the common vocabulary, a first word embedding vector in the first text corpus and a second word embedding vector in the second text corpus;
   generating, for each word in a random sample of the non-landmark words, an artificially shifted word embedding vector by modifying the first word embedding vector for that word;
   training a machine learning classifier to predict whether an artificial shift has been injected for a given word, based on the artificially shifted word embedding vector and the second word embedding vector for the given word; and
   predicting semantic shifts for at least a plurality of the words of the common vocabulary by providing the first word embedding vectors and the second word embedding vectors for at least the plurality of the words of the common vocabulary as input to the trained machine learning classifier.

2. The method of claim 1, wherein modifying the first word embedding vector comprises adding to the first word embedding vector a multiple of the second word embedding vector, wherein the multiple is less than 1.

3. The method of claim 1, wherein generating the first word embedding vector and the second word embedding vector for a given word comprises counting co-occurrences of other words within a predetermined number of words from each occurrence of the given word in the respective corpus.

4. The method of claim 1, wherein the machine learning classifier is a neural network.

5. The method of claim 1, wherein the machine learning classifier is a decision tree.

6. The method of claim 1, wherein the machine learning classifier is a support vector machine.

7. The method of claim 1, further comprising: producing a list of words for which semantic shifts are predicted, and reporting the list of words to a user.

8. The method of claim 1, further comprising, during computerized natural language processing of a body of text, improving the natural language processing by, for at least one word for which one of said semantic shifts is predicted, replacing the at least one word with a synonym for the unshifted meaning.

9. The method of claim 1, further comprising:
   updating the plurality of landmark words to include words for which a semantic shift is not predicted; and
   aligning the word embedding vectors of the first and second text corpora based on the plurality of landmark words.

10. A computer program product comprising one or more computer readable storage media that embody computer executable instructions, which when executed by a computer cause the computer to perform a method comprising:
    obtaining first and second text corpora;
    identifying a common vocabulary of the two text corpora;
    identifying a plurality of landmark words and a plurality of non-landmark words in the common vocabulary;
    generating, for each of the words of the common vocabulary, a first word embedding vector in the first text corpus and a second word embedding vector in the second text corpus;
    generating, for each word in a random sample of the non-landmark words, an artificially shifted word embedding vector by modifying the first word embedding vector for that word;
    training a machine learning classifier to predict whether an artificial shift has been injected for a given word, based on the artificially shifted word embedding vector and the second word embedding vector for the given word; and
    predicting semantic shifts for at least a plurality of the words of the common vocabulary by providing the first word embedding vectors and the second word embedding vectors for at least the plurality of the words of the common vocabulary as input to the trained machine learning classifier.

11. The computer-readable medium of claim 10, wherein modifying the first word embedding vector comprises adding to the first word embedding vector a multiple of the second word embedding vector, wherein the multiple is less than 1.

12. The computer-readable medium of claim 10, wherein generating the first word embedding vector and the second word embedding vector for a given word comprises counting co-occurrences of other words within a predetermined number of words from each occurrence of the given word in the respective corpus.

13. The computer-readable medium of claim 10, wherein the machine learning classifier is a neural network.

14. The computer-readable medium of claim 10, wherein the machine learning classifier is a decision tree.

15. The computer-readable medium of claim 10, wherein the machine learning classifier is a support vector machine.

16. The computer-readable medium of claim 10, wherein the method further comprises: producing a list of words for which semantic shifts are predicted, and reporting the list of words to a user.

17. The computer-readable medium of claim 10, wherein the method further comprises: for at least one word for which a semantic shift is predicted, replacing the at least one word with a synonym for the unshifted meaning.

18. The computer-readable medium of claim 10, wherein the method further comprises:
   updating the plurality of landmark words to include words for which a semantic shift is not predicted; and
   aligning the word embedding vectors of the first and second text corpora based on the plurality of landmark words.

19. An apparatus comprising:
   a memory embodying computer-executable instructions; and
   at least one processor, coupled to the memory, and operative by the computer-executable instructions to facilitate a method comprising:
      obtaining first and second text corpora;
      identifying a common vocabulary of the two text corpora;
      identifying a plurality of landmark words and a plurality of non-landmark words in the common vocabulary;
      generating, for each of the words of the common vocabulary, a first word embedding vector in the first text corpus and a second word embedding vector in the second text corpus;
      generating, for each word in a random sample of the non-landmark words, an artificially shifted word embedding vector by modifying the first word embedding vector for that word;
      training a machine learning classifier to predict whether an artificial shift has been injected for a given word, based on the artificially shifted word embedding vector and the second word embedding vector for the given word; and
      predicting semantic shifts for at least a plurality of the words of the common vocabulary by providing the first word embedding vectors and the second word embedding vectors for at least the plurality of the words of the common vocabulary as input to the trained machine learning classifier.

20. The apparatus of claim 19, wherein the method further comprises:
   updating the plurality of landmark words to include words for which a semantic shift is not predicted; and
   aligning the word embedding vectors of the first and second text corpora based on the plurality of landmark words.

* * * * *